(12) United States Patent
Au

(10) Patent No.: US 10,624,282 B2
(45) Date of Patent: Apr. 21, 2020

(54) HYDROPONIC TRAY AND HYDROPONIC SYSTEM

(71) Applicant: AUASIA AGROTECH Sdn. Bhd., Lahat Ipoh Perak (MY)

(72) Inventor: Chen Hsiung Au, Lahat Ipoh Perak (MY)

(73) Assignee: AUASIA AGROTECH SDN BHD (MY)

( * ) Notice: Subject to any disclaimer, the term of this patent is extended or adjusted under 35 U.S.C. 154(b) by 237 days.

(21) Appl. No.: 15/571,603

(22) PCT Filed: Jun. 5, 2015

(86) PCT No.: PCT/MY2015/000045
§ 371 (c)(1),
(2) Date: Nov. 3, 2017

(87) PCT Pub. No.: WO2016/195472
PCT Pub. Date: Dec. 8, 2016

(65) Prior Publication Data
US 2018/0139915 A1 May 24, 2018

(51) Int. Cl.
*A01G 31/02* (2006.01)
*A01G 9/04* (2006.01)

(52) U.S. Cl.
CPC ............. *A01G 31/02* (2013.01); *A01G 9/045* (2013.01); *Y02P 60/216* (2015.11)

(58) Field of Classification Search
CPC ........ A01G 31/00; A01G 31/02; A01G 31/06; A01G 2031/006; A01G 9/045; A01G 9/047; Y02P 60/216

(Continued)

(56) References Cited

U.S. PATENT DOCUMENTS 4,216,618 A 8/1980 Haub et al.
4,528,774 A 7/1985 Skaife
(Continued)

FOREIGN PATENT DOCUMENTS

CN 202941241 5/2013

*Primary Examiner* — Peter M Poon
*Assistant Examiner* — Marisa V Conlon
(74) *Attorney, Agent, or Firm* — Renner Kenner Greive Bobak Taylor & Weber

(57) ABSTRACT

The tray (10) of the present invention is for use in hydroponics. The tray has a first end and a second end having a longitudinal axis defined therebetween. An inlet (20) is provided at the first end for receiving nutrient and an outlet (30) is provided at the second end for draining nutrient solution. A levee system comprising paddle assemblies (40) extending orthogonal to the longitudinal axis of the tray is disposed between the first end and second end of the tray. The paddle assemblies are adapted to partition the tray to define compartments and to impede the downstream flow of nutrient solution from the first end to the second end. The paddle assemblies are adjustable so as regulate depth of nutrient solution in each compartment to enable optimal irrigation of the plants cultivated in each compartment. To complete a hydroponic system, the tray of the present invention connects to at least one reservoir for holding nutrient solution. The reservoir comprises conduits in flow communication with the inlet of the tray or outlet of the tray. Nutrient solution held in the reservoir is supplied to the tray via the inlet, and nutrient solution in the tray is drained into the reservoir via the outlet.

10 Claims, 7 Drawing Sheets

(58) Field of Classification Search
USPC ............... 47/62 R, 62 A, 62 C, 62 E, 85, 86; 220/563
See application file for complete search history.

(56) References Cited

U.S. PATENT DOCUMENTS

| | | |
|---|---|---|
| 6,247,269 B1 | 6/2001 | Valiquette |
| 10,004,186 B2 * | 6/2018 | Daugirdas ............... A01G 31/06 |
| 10,080,336 B2 * | 9/2018 | Higgins .................. A01G 31/06 |
| 10,238,046 B2 * | 3/2019 | Wu ........................ A01G 31/06 |
| 10,321,696 B2 * | 6/2019 | Wu ........................ A01G 31/06 |
| 2014/0322805 A1 * | 10/2014 | Hazlebeck ............. A01G 31/06 |

* cited by examiner

HYDROPONIC TRAY AND HYDROPONIC SYSTEM

This invention relates to a hydroponic tray. More particularly, this invention relates to a tray that enables adjustment of the depth of nutrient solution within the tray.

DESCRIPTION OF THE PRIOR ART

Hydroponics is a method of cultivating plants using nutrient solutions, without soil. The nutrients that plants normally derive from soil are dissolved into a solution. The plants are usually suspended or cultivated in an inert medium, such as perlite or gravel, that provides root anchorage and functions as a temporary reserve of a nutrient solution.

The flood and drain system is a common hydroponic system. It is a system that operates in a continuous cycle which mainly comprises of two phases that is the flooding phase and draining phase. During the flooding phase, a nutrient solution is delivered to the roots of the cultivated plants. After a predetermined period of time, the draining phase begins and the nutrient solution is drained. The draining phase enables air to reach the roots. The nutrient solution is usually re-circulated and delivered to the roots during the next flooding phase, and the cycle continues.

On the other hand, the nutrient film technique allows a shallow stream of nutrient solution to be constantly supplied to cultivated plants. Therefore, nutrient solution is delivered to the roots of the cultivated plants at all times and nutrient solution is usually re-circulated in the system for a continuous delivery of nutrient solution.

US 2010/0269409 A1 relates to a hydroponic assembly comprising an open tray having a first end that is higher than a second end. A first reservoir is disposed adjacent the first end and a second reservoir disposed adjacent the second end of the tray. In operation, the nutrient solution is supplied to the tray by way of a pump. Once the pump is shut off, the solution is drained back into the reservoirs.

US 2013/0074408 A1 relates to a flood control valve used in a hydroponic irrigation system. The valve has an inlet and an outlet, separated by a flexible rubber membrane and operates using feed pressure to close the outlet when nutrient solution is pumped into the cultivation chamber. Once the pump is stopped, nutrient solution drains automatically due to back pressure.

Prior hydroponic systems, such as the above-referenced US 2010/0269409 A1 and US 2013/0074408 A1, do not enable customization to suit the irrigation requirements of the cultivated plants. All plants cultivated in a system will receive the same irrigation treatment regardless of the types of plant or its stage of cultivation. Therefore, a user will not be able to cultivate different types of plants or plants at different stages of cultivation in a single system. Since these prior systems only enables a specific flood depth or flood time at any given time, the user will be required to provide different systems to cultivate different types of plants or plants at different stages of cultivation and this would involve a greater cost and space requirement as well as time and effort.

These prior hydroponic systems when used in a flood and drain system requires a pump to be in operation during the entire duration of supplying nutrient solution to the cultivated plants. A constant power supply will be required to operate the pump. The frequent usage of the pump will necessitate regular servicing or replacement of damaged parts. This is not desirable, particularly for commercial farms, where the associated costs involved will be substantial.

On the other hand, prior hydroponic systems used in a nutrient film technique does not allow the adjustment of the depth of the stream of nutrient solution delivered to the cultivated plants. The stream of nutrient solution is usually extremely shallow and thus, nutrient solution is only delivered to the root tips of the longer roots that touch the base of the hydroponic systems. This cause insufficient uptake of nutrients and water for the growth of the cultivated plant.

This invention thus aims to alleviate some or all of the problems of the prior art.

SUMMARY OF THE INVENTION

In accordance with a first aspect of the invention, there is provided a tray for use in hydroponics. The tray has a first end and a second end having a longitudinal axis defined therebetween. An inlet is provided at the first end for receiving nutrient and an outlet is provided at the second end for draining nutrient solution. A levee system comprising paddle assemblies extending orthogonal to the longitudinal axis of the tray is disposed between the first end and second end of the tray. The paddle assemblies are adapted to partition the tray to define compartments and to impede the downstream flow of nutrient solution from the first end to the second end. The paddle assemblies are adjustable so as to regulate the depth of nutrient solution in each compartment to enable optimal irrigation of the plants cultivated in each compartment.

The tray of the present invention enables simultaneous cultivation of different groups of plants with different irrigation requirements within a single tray. Each compartment in the tray may contain a group of plants with the same irrigation requirements. The paddle assemblies enable different depths of nutrient solution for each compartment. Therefore, a single tray of the present invention can have multiple compartments that are independent of each other with individual depths of nutrient solution for different plant groups and this offers a solution to cultivate different plants in minimal space.

With the paddle assemblies impeding the downstream flow of nutrient solution, pumps for generating pressure to drive the flow of nutrient solution to the tray may be stopped earlier in the cycle in comparison with existing hydroponic systems where the pump would have to be in operation throughout the cycle of use. When the pump is shut off, the nutrient solution trapped in the tray of this invention, particularly at upstream compartments, will gradually flow to the downstream compartments and exit via the outlet. All compartments would have attained the predetermined depths of nutrient solution for predetermined time intervals before the nutrient solution exits the tray.

In an embodiment, the first end of the tray may be elevated over the second end of the tray. As such, gravity directs the flow of nutrient solution from one end to the other end of the tray.

In a further embodiment, the levee system may comprise a plurality of paddle assemblies.

In a further embodiment, the paddle assemblies may be separately provided from the tray. This provides flexibility for the user to configure the number of compartments and nutrient solution depths of each compartment according to the requirements of the cultivated plants.

In a different embodiment, each paddle assembly may comprise a set of blades extending radially from a shaft. The blade may extend continuously or discontinuously along an entire length of the shaft. The blade may be of uniform or non-uniform dimension. The paddle assembly may also comprise blades of uniform or non-uniform size.

In an embodiment, the paddle assemblies are aligned parallel to one another.

In accordance with a second aspect of the invention, there is provided a hydroponic system comprising a tray in accordance with the first aspect of the invention and a reservoir for holding nutrient solution. The reservoir comprises conduits in flow communication with the inlet and outlet of the tray. Re-circulation of nutrient solution in the system is possible as the inlet of the tray receives nutrient solution from the reservoir and nutrient solution drains from the tray to the reservoir via the outlet. In such systems, there is less wastage as the nutrient solution can be recirculated in the system.

In accordance with a third aspect of the invention, there is provided a hydroponic system for comprising a tray in accordance with the first aspect of the invention and a first and second reservoir for holding nutrient solution. The first reservoir comprises a conduit in flow communication with the inlet of the tray whereas the second reservoir comprises a conduit in flow communication with the outlet of the tray. The inlet of the tray receives nutrient solution from the first reservoir and nutrient solution drains from the tray to the second reservoir via the outlet.

In a further embodiment of the second and third aspect of the invention, the reservoir may further comprise a pump for generating pressure to drive the flow of nutrient solution to the tray. In a flood and drain system using the tray of this invention, there is no necessity for the pump to be in operation for the entire duration of the flooding phase.

The pump may be in intermittent operation during the flooding phase or only in operation at the beginning of the flooding phase.

The tray of the present invention when used in a nutrient film technique allows adjustment of the depth of the stream of nutrient solution delivered to the roots of the cultivated plants. A greater depth of the stream of nutrient solution enables more roots to immerse in the stream in order for a sufficient uptake of nutrient and water for the growth of the cultivated plant.

Additional advantages of the plant cultivation container of this invention will be elaborated in the following pages.

BRIEF DESCRIPTION OF THE DRAWINGS

The invention is illustrated, although not limited, by the following description of embodiments made with reference to the accompanying drawings in which.

DETAILED DESCRIPTION OF THE EMBODIMENTS

Different types of plants and plants at different stages of cultivation have different irrigation requirements. The present invention enables a set of different groups of plants to be cultivated simultaneously within the same hydroponic tray, in individual compartments that provide optimal irrigation in accordance with the requirements of the plants in each compartment. It is space-saving and cost effective.

In a flood and drain system, plant roots are irrigated with a nutrient solution during the flooding phase thereby enabling the uptake of nutrients and water by the roots, whereas the draining phase allows air to reach the roots.

In a nutrient film technique, a stream of nutrient solution is constantly supplied to plant roots.

Depending on the type of hydroponic system, for example in a flood and drain system, the tray 10 of the present invention enables the operation time of a pump for supplying nutrient solution to the plants to be considerably reduced and this effectively sustains the hydroponic system for a longer period of time.

The tray 10 of the present invention when used in a nutrient film technique enables the delivery of nutrient solution not only to long roots, but also to short roots which length have not reach the base of the tray.

The tray 10 of this invention mainly comprises an inlet 20, an outlet 30 and a levee system. The tray 10 is preferably for cultivating plants in individual pots or net pots having an inert medium, such as perlite or gravel, that provides root anchorage and functions as a temporary reserve of a nutrient solution. Pots for hydroponic systems normally comprise holes at the bottom for enabling drainage of fluid or air ventilation. Net pots normally comprise mesh walls, particularly at the bottom, that enable roots to grow beyond the walls.

Figure 1:
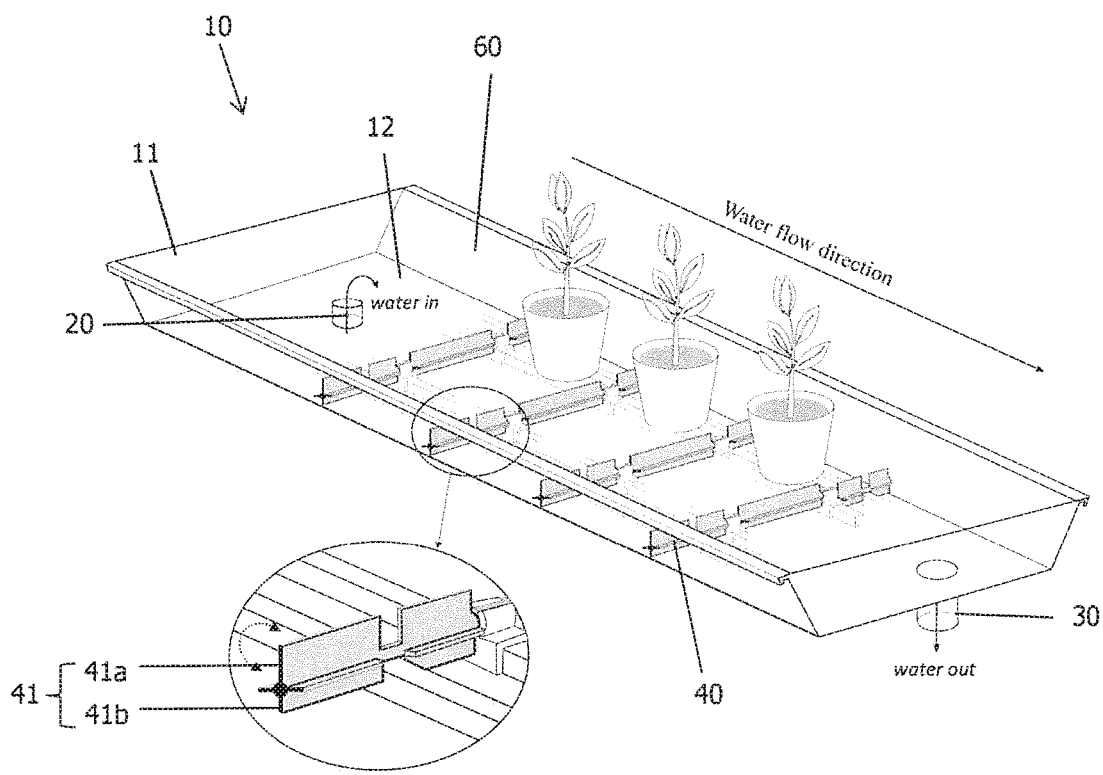
FIG. 1 shows a perspective view of the tray according to the present invention.

The tray 10 may generally be an open-top or close-top container of any suitable shape and size. For example, the tray may have a narrow width along its longitudinal axis such that the tray resembles a gutter. For close-top containers, the top comprises receiving holes for holding plant pots or net pots suspended from the top of such container. As shown in FIG. 1, the tray 10 comprises side walls 11, a base 12 and an open top. The tray 10 may be uniformly shaped throughout its height, or it may have a tapered configuration. The tapered configuration of the tray 10 may be tapered towards its base 12 or top, i.e. downwardly or upwardly tapered. The tray 10 may be made of any suitable material, such as polyvinyl chloride (PVC). All components of the tray 10 may be made of the same type of material or different types of materials.

The inlet 20 and outlet 30 are provided along the longitudinal axis of the tray 10, preferably at opposite ends of the tray 10 i.e. at a first end and a second end. The inlet 20 and outlet 30 may be simple openings provided at the base 12 that allow fluid to pass therethrough. The peripheral edge of the openings may further comprise a raised lip, either raised towards the interior of the tray 10 or exterior of the tray 10. The raised lip is may act as an adapter for connecting to conduits in flow communication with separately provided nutrient solution reservoirs.

Figure 8:
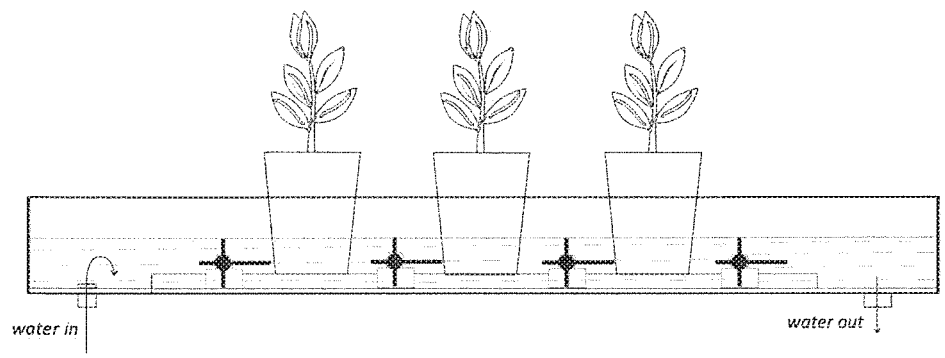
FIG. 8 shows an arrangement of paddle assemblies in a tray according to an embodiment of the present invention.
Figure 9:
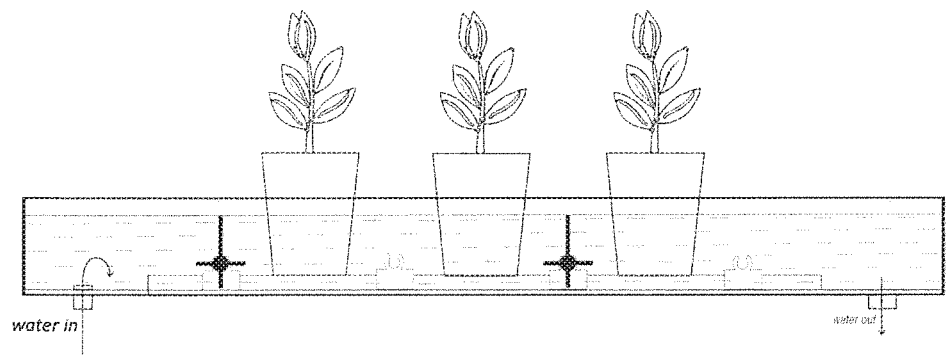
FIG. 9 shows different positions of paddle assemblies in a tray according to an embodiment of the present invention.
Figure 10:
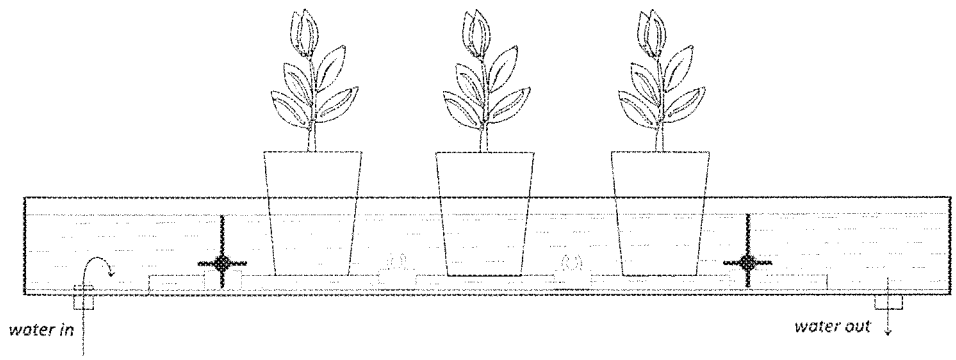
FIG. 10 shows different positions of paddle assemblies in a tray according to an embodiment of the present invention.

The levee system comprises paddle assemblies 40 that lie orthogonal to the longitudinal axis of the tray 10. The paddle assemblies 40 may be separately provided from the tray 10. The paddle assemblies 40 are disposed in between the first end and the second end of the tray 10. The tray 10, from the first end to the second end, is partitioned by the paddle assemblies 40 to define compartments. The compartments may be of equal size as shown in FIG. 8 or unequal size as shown in FIGS. 9 and 10. The paddle assemblies 40 impede the downstream flow of fluid from the first end to the second end of the tray 10.

There may be a plurality of paddle assemblies 40 within a tray 10. When a plurality of paddle assemblies 40 is provided, they may be aligned parallel to each other. The paddle assemblies 40 may extend to the side walls 11 of the tray 10. The paddle assemblies 40 may be a single constructed unit that extends to the side walls 11, separate constructs assembled to form a unit that extends to the side walls 11 or multiple constructs randomly disposed within the tray 10.

The paddle assemblies 40 may be separately provided and mounted on the tray 10 or provided to be integral with the tray 10. Preferably, the paddle assemblies 40 and the tray 10 are separate constructs and the paddle assemblies 40 may be mounted on the base 12 of the tray 10 in a variety of combinations with regards to its position, for example, in FIGS. 8 to 10. Any suitable mounting methods may be employed.

Figure 2:
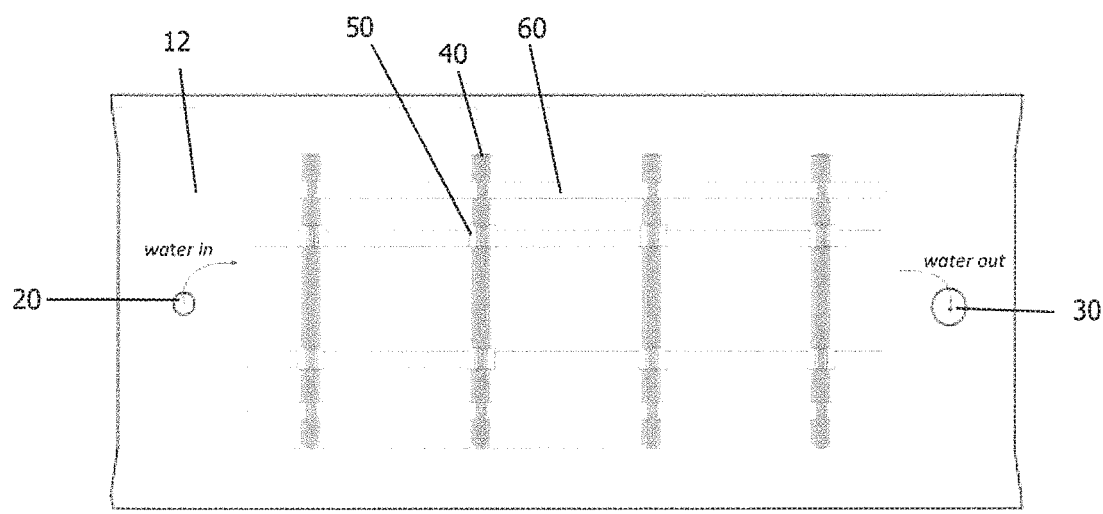
FIG. 2 shows a top view of the tray according to the present invention.
Figure 3:
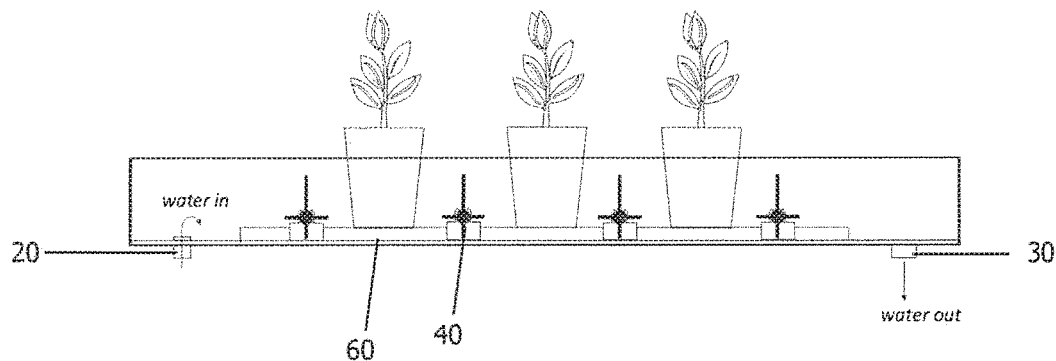
FIG. 3 shows a side view of the tray according to the present invention.
Figure 4:
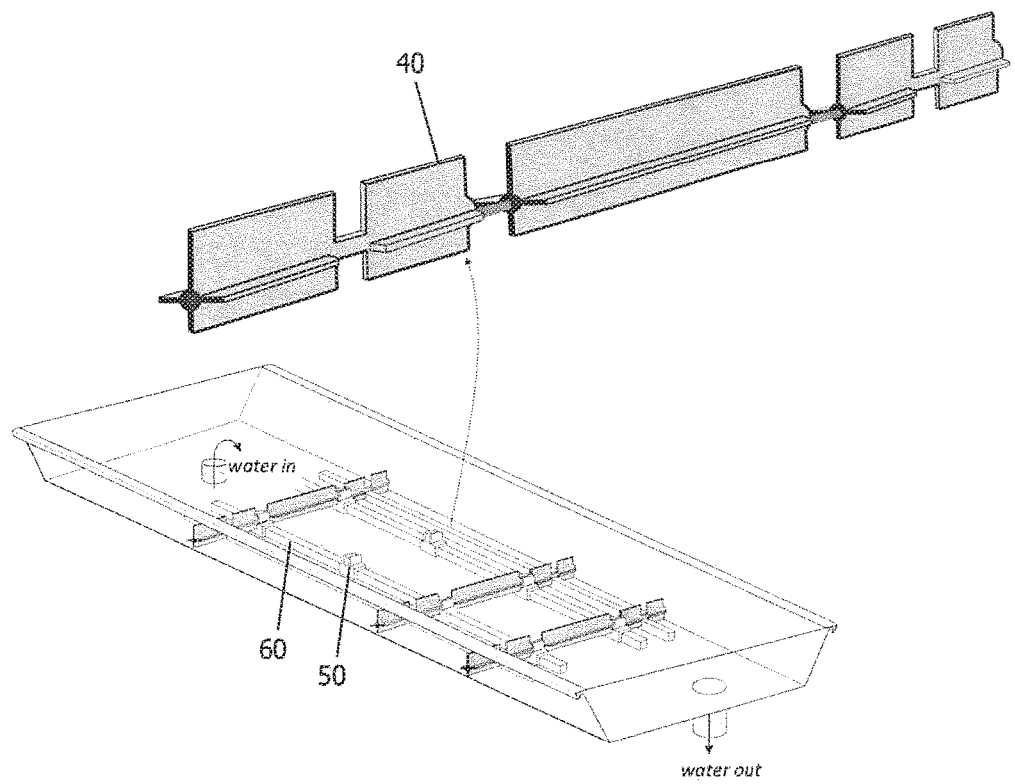
FIG. 4 shows a paddle assembly disengaged from the tray.

The base 12 of the tray 10 may further comprise support bars 60. The support bars 60 are preferably disposed in the direction of the flow of the nutrient solution from the first end to the second end and thus, would not impede the flow of the nutrient solution in the tray 10. As shown in FIG. 2, the support bars 60 are disposed in a direction parallel to the longitudinal axis of the tray 10. The support bars 60 serve as an elevated platform for the cultivated plants. The pots of the cultivated plants may rest on the platform and thus, will not rest directly on the base 12 of the tray 10. This prevents the interference of the residual nutrient solution during the draining phase in a flood and drain system. The residual nutrient solution will not come in contact with the plant pot and this allows air to enter the pot via the holes enabling ventilation within the pot.

Figure 5:
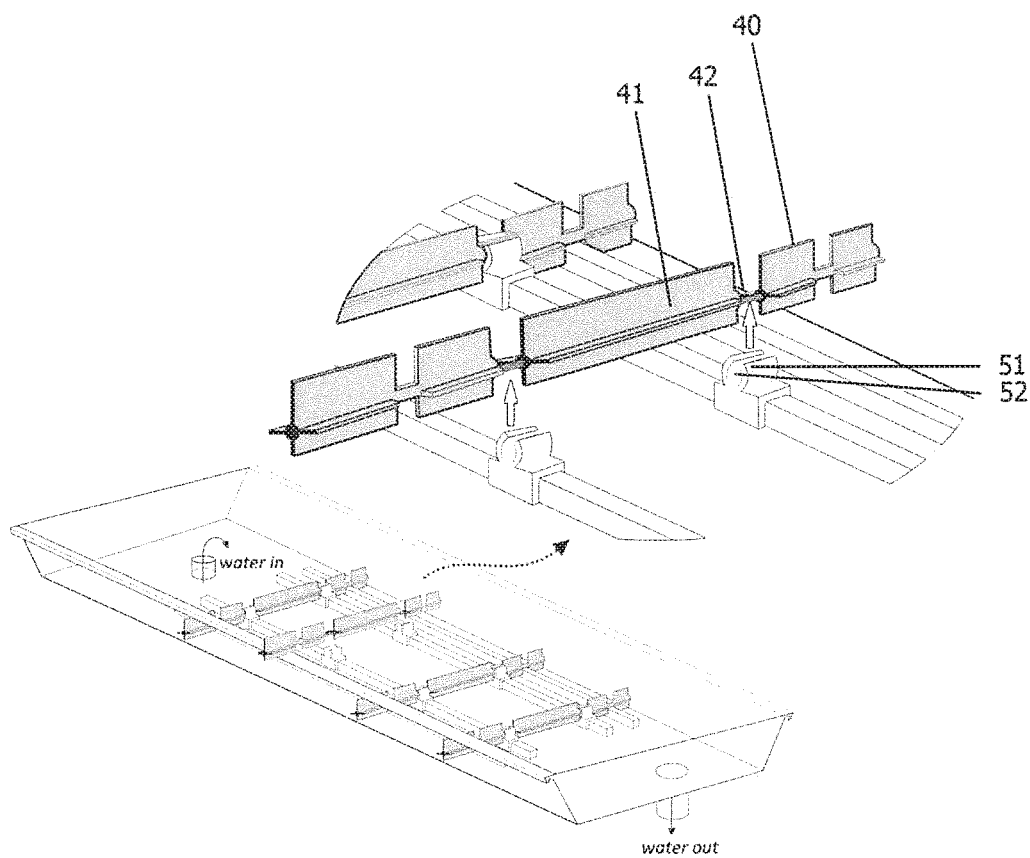
FIG. 5 shows an enlarged view of the interaction between a paddle assembly and mechanicals joints of the tray.

The support bars 60 may be interlocked with the paddle assemblies 40 via mechanical joints 50. The mechanical joints 50 may complement the peripheral shape of the interlocking part of the paddle assemblies 40. For example, as shown in FIG. 5, the mechanical joints 50 may be retaining clips comprising a groove 51 with gripping fingers 52 that can briefly deflect during the interlocking process to catch the paddle assemblies 40 in the groove 51. To disengage the paddle assemblies 40 from the mechanical joint 50, the gripping fingers 52 briefly deflects, releasing the paddle assemblies 40 as it is pulled away from the groove 51.

Each paddle assembly 40 may comprise a set of blades 41 extending radially from a shaft 42. The blades 41 may run continuously along the shaft 42, or discontinuously to allocate a gripping portion for interlocking with the support bars 60. The gripping portion may be a rod to accommodate rotation when interlocked with the mechanical joint 50 of the support bar 60. The shape and configuration of the blades 41 match the surface configuration of the base 12 of the tray 10 adjacent thereto, to enable accommodation of the blades 41 when mounted on the tray 10. The paddle assemblies 40 and the side walls 11 enable delineation of a compartment, defining a separate section within the tray 10.

Figure 7:
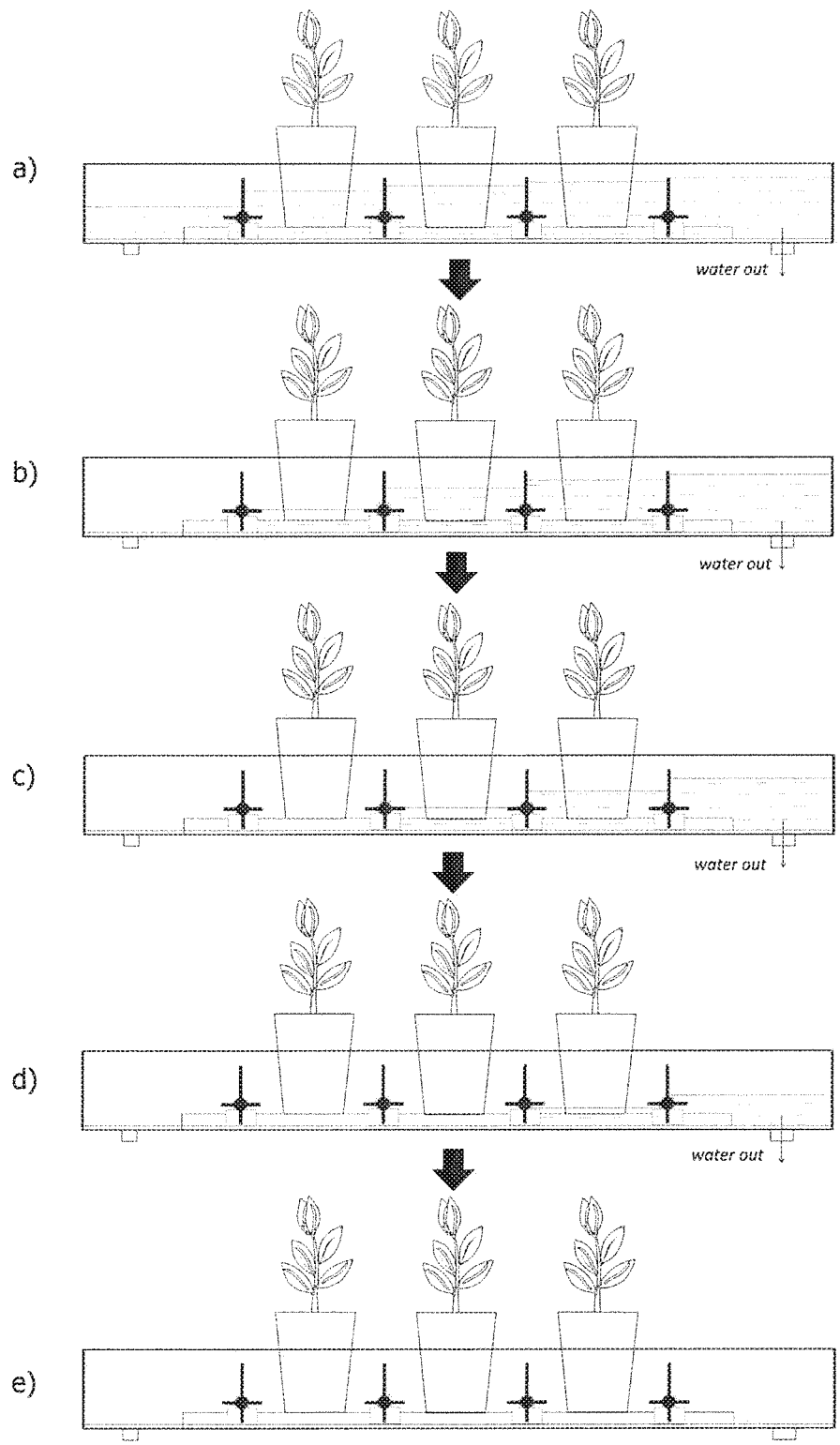
FIG. 7 shows a sequence of events of the draining phase in a tray according to an embodiment of the present invention.

The blades 41 of each assembly may be of uniform or non-uniform dimension. Each paddle assembly 40 may also comprise blades 41 of uniform or non-uniform size. Preferably, the paddle assembly 40 comprises a set of non-uniform sized blades 41. The orientations of the different sizes of blades 41 when mounted on the tray 10 provide a variable height profile to the paddle assembly 40 in use. The height represents the vertical measurement of the paddle assembly 40 in use. To achieve a greater height, the longest blade 41a of the paddle assembly 40 may be rotated to an upright orientation as shown in FIG. 7. As can be seen in FIG. 8, a shorter blade 41b in an upright orientation will provide a lower height.

The height of the paddle assembly 40 corresponds to the predetermined depth of nutrient solution in a compartment, and incoming fluid will continuously fill the compartment until it reaches the predetermined depth before the fluid overflows to the next compartment. The period for filling each compartment depends on the volume of fluid required to fill the compartment to its predetermined depth. The position and height of the paddle assemblies 40 are adjustable to define the size of a compartment according to the irrigation requirements of the plants cultivated in each compartment.

To create a complete hydroponic system, the tray 10 of this invention may be connected to at least one reservoir for holding nutrient solution. The reservoir further comprises conduits in flow communication with the inlet 20 of the tray 10 or outlet 30 of the tray 10. Nutrient solution held in the reservoir is supplied to the tray 10 via the inlet 20, and nutrient solution in the tray 10 is drained into the reservoir via the outlet 30.

In hydroponic systems with only one reservoir, the tray 10 receives nutrient solution from the reservoir and nutrient solution is drained back to the reservoir. The nutrient solution will be re-circulated in the system for multiple cycles.

In hydroponic systems with two reservoirs, the tray 10 receives nutrient solution from the first reservoir and nutrient solution is drained to a second reservoir. The second reservoir may be a wastewater tank. In such systems, fresh batches of nutrient solution must be provided to the first reservoir regularly.

Depending on the position of the reservoir in relation to the tray 10, a pump may be required to draw nutrient solution to the tray 10. If the reservoir is located at a higher level than the tray 10, gravity generates a natural pressure that drives the flow of the nutrient solution to the tray 10. However, if the reservoir is placed below or on the same level as the tray 10, a pump will be required to create a differential pressure to force nutrient solution to flow into the tray 10.

Prior to use, the user will have to determine the number of compartments required, and the depths of nutrient solution and nutrient solution supply period required by the cultivated plants in each compartment. The selected paddle assembly 40 when mounted to the tray 10 will have a height that corresponds to the predetermined depth of nutrient solution of the adjacent upstream compartment. The paddle assembly 40 delays downstream compartments from being filled with nutrient solution prior to upstream compartments being filled with nutrient solution to predetermined depths for predetermined time intervals. The height of the paddle assembly 40 depends on the length of the blades 41. Multiple paddle assemblies 40 may be mounted on the tray 10 to define multiple compartments. The tray 10 may comprise paddle assemblies 40 of different heights, thereby providing compartments that enable nutrient solution to fill to different depths.

Once the number of compartments, the depths of nutrient solution and nutrient solution supply period of each compartment has been determined, the appropriate number and configuration of paddle assemblies 40 can be selected and mounted at the appropriate position within the tray 10 with blades 41 in the appropriate orientation.

As shown in FIG. 5, the gripping portions of the paddle assemblies 40 are pushed into the groove 51 of the retaining clips on the support bars 60. Thereafter, the gripping assemblies and retaining clips are interlocked together. A blade 41 of the paddle assemblies 40 may be adjusted to an upright position to provide a height that corresponds to the predetermined depth of nutrient solution of the adjacent upstream compartment. The interlocking of the gripping assemblies and retaining clips provides a tight-fit that enables the blades 41 to be stationary. Furthermore, the shape and configuration of the blades 41 that matches the surface configuration of the base 12 of the tray 10 adjacent thereto secures the position of the paddle assemblies 40 on the tray 10.

When in use, the inlet 20 and outlet 30 of the tray 10 are connected to a reservoir containing nutrient solution and wastewater tank respectively, or both inlet 20 and outlet 30 are connected to a reservoir containing nutrient solution. Preferably, both inlet 20 and outlet 30 are connected to a reservoir in order for the nutrient solution to be re-circulated to the tray 10. Depending on the position of the reservoir connected to the inlet 20 of the tray 10, nutrient solution may either flow into the tray 10 naturally or be pumped into the tray 10.

Flood and Drain System

During the flooding phase, incoming nutrient solution flows from the first end to the second end of the tray 10. The upstream compartments will fill up faster due to the paddle assembly 40 obstructing the flow of nutrient solution to the downstream compartments. Therefore, the second end of the tray 10 comprising the outlet 30 will have a relatively lower level of nutrient solution compared to the first end of the tray 10 during the early flooding phase. The flow of outgoing nutrient solution is preferably lower than incoming nutrient solution, thus, avoiding rapid drainage of nutrient solution from the tray 10.

Figure 6:
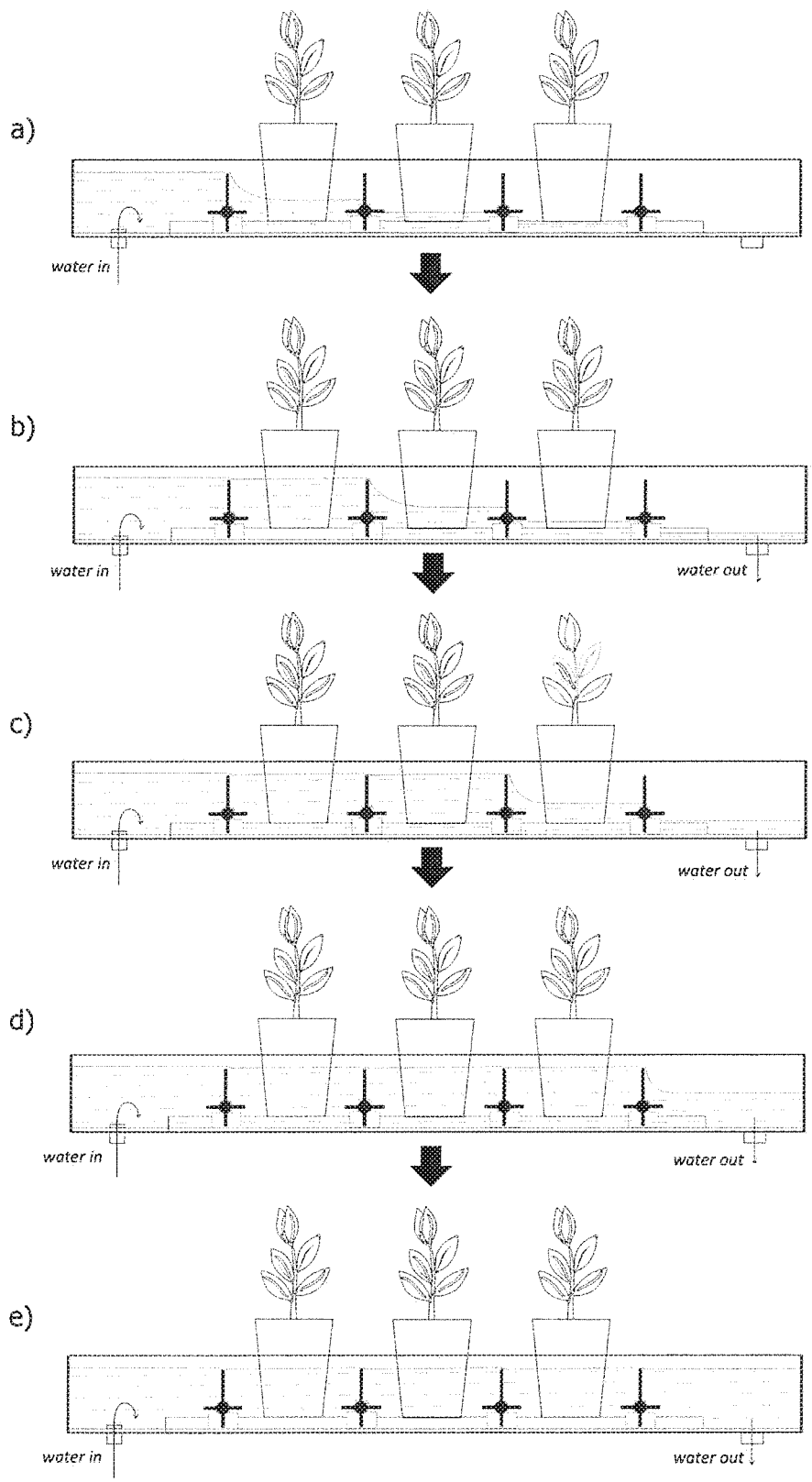
FIG. 6 shows a sequence of events of the flooding phase in a tray according to an embodiment of the present invention.

As shown in FIG. 6a, once the depth of the solution reaches the height of the paddle assembly 40, the solution overflows to the next downstream compartment. The same process repeats and the nutrient solution eventually fills the downstream compartments as shown in FIGS. 6b to 6d.

Eventually, the level of nutrient solution will be even in all compartments of the tray 10 as shown in FIG. 6e. At this stage, the flow of incoming nutrient solution may be equal to the flow of outgoing nutrient solution.

To start the draining phase, incoming nutrient solution is stopped either manually or by an automatic timing control. Once the inlet 20 is closed, nutrient solution in the upstream compartments flow towards the second end as nutrient solution is drained out via the outlet 30. As shown in FIGS. 7a to 7d, nutrient solution level starts to fall in the upstream compartments followed by downstream compartments in a consecutive order.

The nutrient solution enclosed within the tray 10 will gradually flow towards the outlet 30 that is open during the draining phase. Similar to the flooding phase, the upright blade 41 of the paddle assembly 40 obstructs nutrient solution from flowing to the downstream compartments and thus, delaying the rapid fall of nutrient solution level in each compartment.

Nutrient Film Technique

In a nutrient film technique, the nutrient solution supply period is irrelevant as the nutrient solution will constantly be supplied to the cultivated plants.

In conventional nutrient film technique, the depth of the nutrient solution stream flowing in hydroponic tray cannot be adjusted.

In a tray 10 of the present invention, the presence of paddle assemblies 40 enable the tray 10 to be compartmentalized and the depth of the nutrient solution stream to be adjusted according to the needs of the plants cultivated in each compartment.

Figure 11:
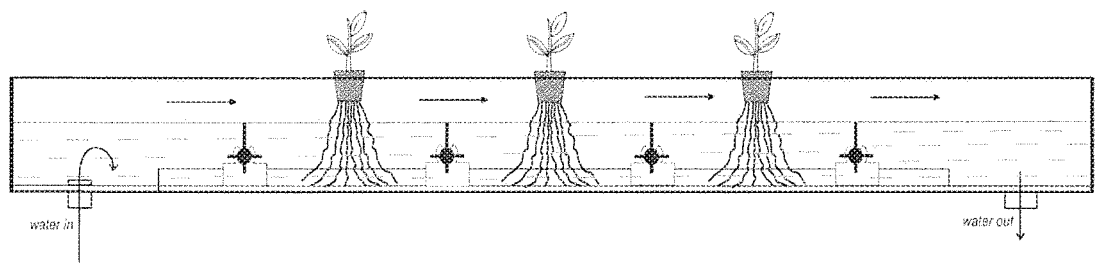
FIG. 11 shows different positions of paddle assemblies in a tray according to an embodiment of the present invention.
Figure 12:
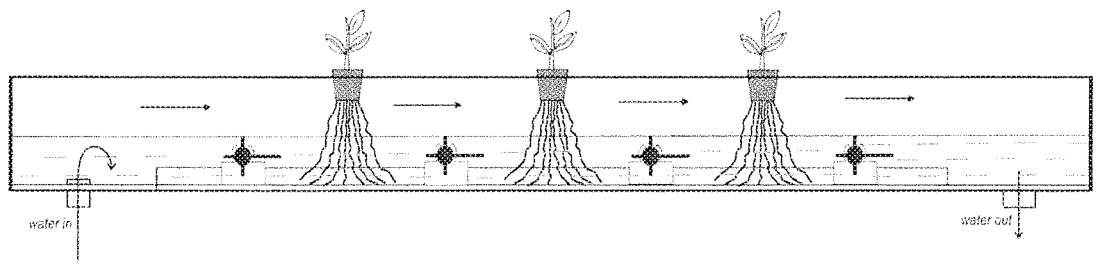
FIG. 12 shows different positions of paddle assemblies in a tray according to an embodiment of the present invention.

FIGS. 11 and 12 shows cultivated plants suspended from the top of the tray 10. The roots grow towards the base 12 of the tray 10. The depth of nutrient solution flowing within the tray 10 encompasses at least half the height of the tray 10 and this is usually not possible in prior nutrient film technique.

The depth of the nutrient solution depends on the overall height of the paddle assembly 40. If a higher depth of nutrient solution is required, the longest blade 41a may be adjusted to an upright position to provide a height that corresponds to the predetermined depth of nutrient solution of the adjacent upstream compartment FIGS. 11 to 12 also show a variety of combinations with regards to the position of the paddle assembly and orientation of the blades in a tray of the present invention used in a nutrient film technique. This enables re-usability of the tray 10 which can be customized to suit the irrigation requirements of the cultivated plants each time.

All directional statements such as front/forward, back/rear, top, bottom, lateral, inward, outward, made herein are relative to the orientation of the plant cultivating container when in use.

As will be readily apparent to those skilled in the art, the present invention may easily be produced in other specific forms without departing from its scope or essential characteristics. The present embodiments are, therefore, to be considered as merely illustrative and not restrictive, the scope of the invention being indicated by the claims rather than the foregoing description, and all changes which come within therefore intended to be embraced therein.

The invention claimed is:

1. A hydroponics tray, said tray comprising:
   a first end and a second end having a longitudinal axis defined therebetween;
   an inlet provided at said first end for receiving nutrient solution;
   an outlet provided at said second end for draining nutrient solution; and
   a levee system comprising static paddle assemblies extending orthogonal to the longitudinal axis of said tray and disposed between said first end and said second end, said paddle assemblies statically adapted to partition said tray to define compartments and to impede the downstream flow of nutrient solution from said first end to said second end, wherein said paddle assemblies comprise a cross-shaped assembly having four blades extending radially from a shaft and are adjustable so as to regulate depth of nutrient solution in each compartment, thereby enabling optimal irrigation of the plants cultivated in each compartment.

2. The hydroponics tray according to claim 1, wherein said first end is elevated over said second end.

3. The hydroponics tray according to claim 1, wherein said paddle assemblies are detachable from said tray.

4. The hydroponics tray according to claim 1, wherein said blades are of uniform dimension.

5. The hydroponics tray according to claim 1, wherein said blades are of non-uniform dimension.

6. The hydroponics tray according to claim 1, wherein said paddle assemblies are aligned parallel to one another.

7. A hydroponic system comprising:
   a hydroponics tray as claimed in claim 1; and
   a reservoir for holding nutrient solution, said reservoir further comprising
      a conduit in flow communication with said inlet of said tray; and
      a conduit in flow communication with said outlet of said tray,
   wherein said inlet of said tray receives nutrient solution from said reservoir and the nutrient solution drains from said tray to said reservoir via said outlet, enabling a recirculation of nutrient solution with the system.

8. The hydroponic system according to claim 7, wherein said reservoir further comprises a pump for generating pressure to drive the flow of nutrient solution to said tray.

9. A hydroponic system comprising:
   a hydroponics tray as claimed in claim 1;
   a first reservoir for holding nutrient solution, said first reservoir further comprising
      a conduit in flow communication with said inlet of said tray; and
   a second reservoir for holding nutrient solution, said second reservoir further comprising
      a conduit in flow communication with said outlet of said tray,
   wherein said inlet of said tray receives nutrient solution from said first reservoir and the nutrient solution drains from said tray to said second reservoir via said outlet.

10. The hydroponic system according to claim 9, wherein said first reservoir further comprises a pump for generating a pressure to drive the flow of the nutrient solution to said tray.

\* \* \* \* \*